T. Holmes,
Bread Machine.

No. 91,335. Patented June 15, 1869.

Witnesses:
A. W. Almquist
Jno. H. Brooks

Inventor
Thomas Holmes
per Munn & Co
Attys

United States Patent Office.

THOMAS HOLMES, OF WILLIAMSBURG, NEW YORK.

Letters Patent No. 91,335, dated June 15, 1869.

IMPROVED REVOLVING DOUGH-MIXER.

The Schedule referred to in these Letters Patent and making part of the same.

*To all whom it may concern:*

Be it known that I, THOMAS HOLMES, of Williamsburg, in the county of Kings, and State of New York, have invented a new and improved Revolving Dough-Mixer; and I do hereby declare that the following is a full, clear, and exact description thereof, which will enable others skilled in the art to make and use the same, reference being had to the accompanying drawings, forming part of this specification, in which—

Similar letters of reference indicate corresponding parts.

Figure 1:
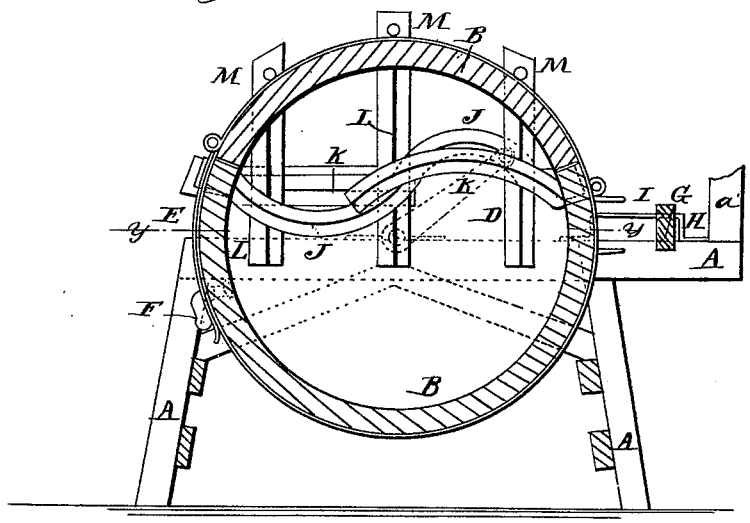
Figure 1 is a vertical cross-section of my improved machine, taken through the line $x\ x$ of fig. 2.
Figure 2:
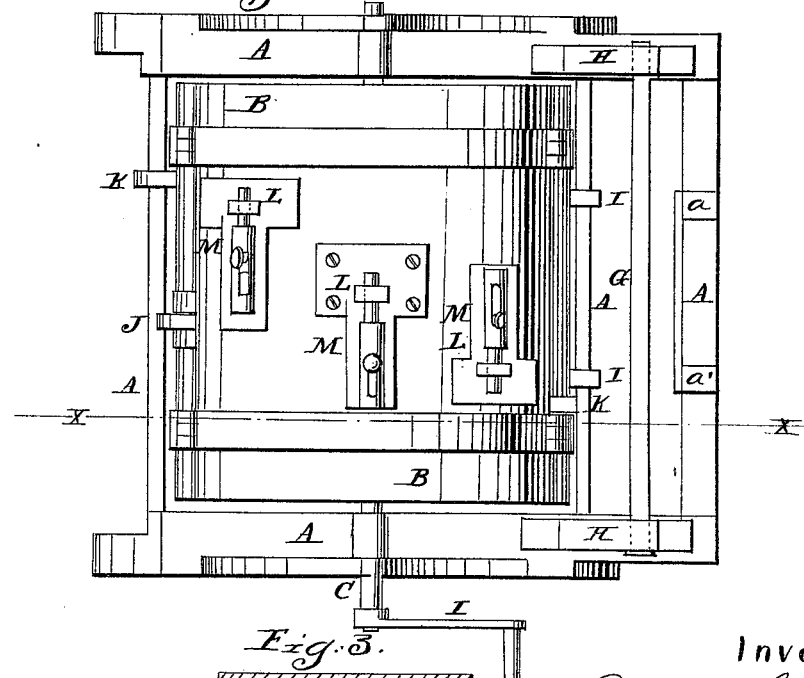
Figure 2 is a top view of the same.
Figure 3:
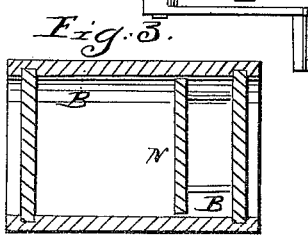
Figure 3 is a detail longitudinal section of the revolving cylinder, taken through the line $y\ y$ of fig. 1.

My invention has for its object to furnish an improved machine for wetting the flour, or mixing or forming the dough, which shall be simple in construction and effective in operation, and at the same time easily operated; and It consists in the construction and combination of the various parts of the machine, as hereinafter more fully described.

A is the frame of the machine, which is made of a suitable height, and of a length and breadth proportioned to the desired capacity of the machine.

B is a cylindrical vessel, which may be made larger or smaller, according to the amount of flour to be wet at a time. A vessel about three feet long, and three feet in diameter, will wet or mix about a barrel of flour at a time.

To the ends of the vessel B are attached journals, C, which revolve in bearings attached to the frame A, and to the projecting end of one or both of which is attached a crank, D, by which the said cylinder B may be revolved.

The vessel B is divided longitudinally into two unequal parts, which said parts are hinged to each other at one edge, and secured to each other at the other edge, when closed, by the hasps E and buttons F.

G is a bar, the ends of which enter long keepers H, attached to the end bars of the frame A, so that the said bar may be moved laterally to or from the cylindrical vessel B.

I are brackets or catches attached to the larger part of the vessel B, near its upper edge, into which the bar G enters to hold the said vessel securely in position, and prevent its turning while the flour is being put into, or the dough removed from it.

$a'$ are short posts attached to the rear part of the frame A, upon the upper ends of which the smaller or hinged part of the vessel B rests when turned back or opened.

J is a curved or S-shaped knife, the ends of which rest in notches in the upper edges of the larger part of the vessel B, and which are secured in place by the closing down of the smaller part of said vessel upon them.

K are shorter knives which may be made straight or curved, and one end of each of which is inserted and secured in notches in the upper edge of the larger part of the vessel B, in the same manner as the longer knives J are secured. The knives K and J may be used in connection with each other, or either kind may be used alone, as may be desired.

L are knives, the shanks of which fit into and pass through holes or sockets in the smaller or hinged part of the cylindrical vessel B, where they are secured in place by bolts M, keys, wedges, or other convenient means. The knives L may be used either with or without the knives J and K, or either of them, as may be desired.

When the mixer is not required for immediate use for mixing another batch, the mixed dough may be allowed to stand and become light in said vessel; but when the mixer is again required for immediate use, the mixed dough may be removed to and allowed to rise in an ordinary mixing-trough, or other suitable receptacle.

In using the machine, the desired amount of flour and water is placed in the cylindrical vessel B, which is then securely closed, and slowly revolved, until its contents are thoroughly mixed.

N is an adjustable removable partition placed transversely in the vessel B, and supported, when adjusted in position, by arms, bars, blocks, or other convenient supports, placed between it and the end of the vessel B. This adjustable partition enables the vessel B to be adjusted to any desired capacity, but more especially to confine the dough when left to rise.

Having thus described my invention,

I claim as new, and desire to secure by Letters Patent—

1. The revolving cylindrical vessel B, made in two unequal parts, and provided with knives J K L, and operating substantially as herein shown and described, and for the purpose set forth.

2. The combination of the bar G, keepers H, and catches or brackets, I, with the cylindrical vessel B and frame A, substantially as herein shown and described and for the purpose set forth.

3. The combination of the adjustable transverse partition N, constructed with the lateral arms, with the cylindrical vessel B, substantially as herein shown and described, and for the purpose set forth.

The above specification of my invention signed by me, this 8th day of May, 1869.

THOS. HOLMES.

Witnesses:
FRANK BLOCKLEY,
JAMES T. GRAHAM.